Figure 6:
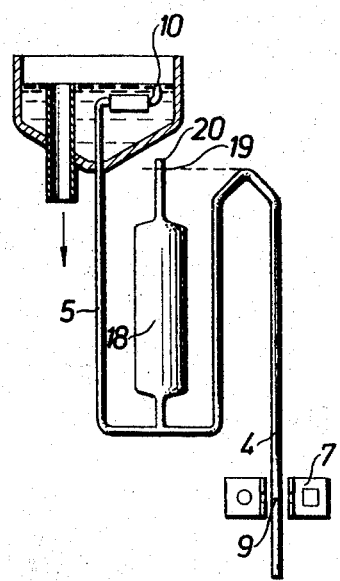

United States Patent [19]
Thulin

[11] 3,769,841
[45] Nov. 6, 1973

[54] DEVICE FOR AUTOMATIC SAMPLING AND MEASUREMENT OF LIQUID VOLUMES

[75] Inventor: Sigvard Thulin, Taby, Sweden

[73] Assignee: AGA Aktiebolag, Lidingo, Sweden

[22] Filed: Nov. 4, 1971

[21] Appl. No.: 195,758

[30] Foreign Application Priority Data
Nov. 12, 1970 Sweden.............................. 15298/70

[52] U.S. Cl............................. 73/425.4 P, 222/405
[51] Int. Cl................................................ B01l 3/02
[58] Field of Search................... 73/421 B, 425.4 P, 73/425.6; 222/61, 204, 405, 416, 394

[56] References Cited
UNITED STATES PATENTS

| | | | |
|---|---|---|---|
| 2,995,037 | 8/1961 | Parker et al....................... | 73/421 B |
| 3,015,957 | 1/1962 | Paulson et al..................... | 73/421 B |
| 3,118,306 | 1/1964 | Sanz............................... | 73/425.4 P |
| 3,117,723 | 4/1965 | Pedersen........................ | 73/425.4 P |

*Primary Examiner*—S. Clement Swisher
*Attorney*—Roberts B. Larson et al.

[57] ABSTRACT

Automatic sampling and measurement device for liquid volumes in which the orifice of a tube is submersible in the liquid to be sampled, there being above the liquid surface an appropriate overpressure in relation to the pressure at the other end of the tube, there being further placed a detector at a defined level of the tube, the volume in the tube between its orifice submersible in the liquid and said level corresponding to the liquid volume to be sampled, the detector being caused to activate a device which raises the tube orifice out of the liquid, when the interface between liquid and gas in the tube reaches said level, after which the overpressure forces the so measured liquid volume out through the other end of the tube.

10 Claims, 8 Drawing Figures

Fig. 1  Fig. 2  Fig. 3  Fig. 4

DEVICE FOR AUTOMATIC SAMPLING AND MEASUREMENT OF LIQUID VOLUMES

The invention relates to a device for automatic sampling and measurement of liquid volumes, comprising the orifice of a hose, tube or the like which is submersible in the liquid from which a volume is to be sampled and measured, there being, at or above the liquid surface, a suitable overpressure in relation to the pressure at the other end of the tube or the like.

There is a need for automatic sampling with exactly defined liquid volume within many sectors of industry, especially within process engineering and, for example, at sewage plants. For automatic anaylsis machines of various kinds increasingly high requirements are placed in respect of such factors as sampling and reagent pipettes with extremely high reliability, high precision, minimal carry-over —i.e. transfer of residue from one sample to the next —and long life. In many cases it is also desirable or even necessary to be able to vary the present sampling volume. There is furthermore a clear tendency to the performance of analyses with smaller sample quantities, for which reason the sampling devices must be able to collect increasingly smaller samples with the same or even increased accuracy.

The object of the present invention is to achieve such a device for automatic sampling and measurement both of large and small liquid samples with high accuracy, possessing high reliability, long life and good repetition frequency without use of valves and practically entirely without risk of leakage.

This is achieved according to the invention chiefly through the fact that, in a device of the kind referred to, a detector is placed at a defined level of the sampling tube, that the volume in the tube between its orifice submersible in the liquid and said level corresponds to the liquid volume to be sampled and measured, and that, as soon as the interface between liquid and gas in the tube reaches said level, the detector is caused to activate a device which raises the orifice of the tube of the liquid, after which the over-pressure forces the so measured liquid volume out through the other end of the tube in the known manner.

In order to be able to vary the present sample volume the detector may suitably be moved along the tube for setting of the liquid volume to be sampled and measured.

For the sampling of small quantities the tube may suitably consist of a capillary tube. For sampling of larger volumes the tube may have a flare between the orifice and the detector level or be connected to a container of defined volume situated below the level of the orifice. Above the liquid surface there may be a gas with elevated pressure and/ or at the other end of the tube, there may be a lower pressure or negative pressure.

For submersion of the orifice of the tube in the liquid one section of the tube may suitably be flexibly movable and the remainder rigid. Instead, the entire tube may be rigid and attached to a container with flexible wall material, the point of attachment of the tube being vertically adjustable relative to the liquid level so that the orifice of the tube can be placed above or below the same. One can also arrange for the orifice of the tube to be stationary and raise the liquid level for collection of the sample. For sampling from liquids with varying level, e.g. lakes or watercourses, the device according to the invention can be coupled to a float for adaptation to variations in said level.

Figure 5:
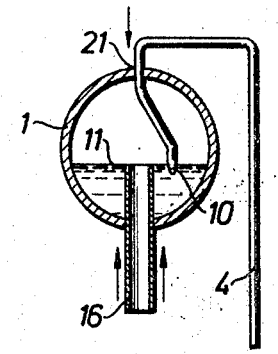
Figure 7:
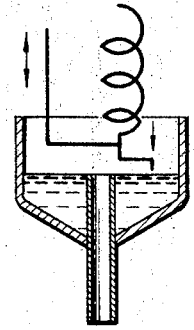
Figure 8:
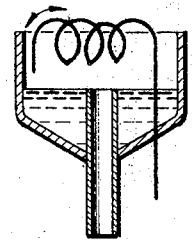

The invention will now be described with reference to the attached drawing, in which FIG. 1 shows an embodiment of the device according to the invention, the part of the tube next to the vertically adjustable orifice being below the liquid level, FIG. 2 a modification of the embodiment of FIG. 1, the part of the tube next to the orifice being above the liquid level, FIG. 3 shows the inlet of a rigid tube through a sampling liquid vessel from below, FIG. 4 illustrates the inlet of a rigid tube through the sampling liquid vessel from above, FIG. 5 shows a vessel with rigid sampling tube and flexible vessel walls, FIG. 6 illustrates a special embodiment for sampling of large quantities, FIG. 7 and 8 show embodiments in which the mobility of the orifice of the tube is obtained by forming one end of the tube as a helix.

The principle of the invention is illustrated with reference to the two embodiments shown schematically in FIGS. 1 and 2.

The desired volume is measured between the upper orifice 10 of a tube 5, possibly a capillary tube, and a selected, well defined level 9 of the (capillary) tube 4 through which the sample is transported out of the device. The measurement is made by lowering/raising the orifice 10 of the first-mentioned tube 5 to a point just below the level 11 of the liquid 12 of which the desired volume is to be measured. This lowering/raising is rendered possible in FIGS. 1 and 2. through the flexible hose 6 between pipes 4 and 5 and the device 13, 17.

By means of a gas overpressure above this liquid surface relative to the gas pressure at end 14 of the tube 4, or directly by force of gravity, the liquid is forced through said tube. The gas pressure at the tube end 14 can generally be greater or less than or equal to the atmospheric pressure. When the interface between liquid and gas in the tube 4 reaches the selected level 9, this is detected by means of a suitable detector 7, which causes the tube orifice 10 to be rapidly raised out of the liquid by the device 13, 17. Thereby a liquid volume defined by the volume of the tube between said detection level 9 and the tube orifice 10 has been separated from the liquid 12 and is forced by said gas overpressure or by force of gravity through the tube 4 and out of its lower end 14. An additional advantage of this arrangement is that the liquid is quickly and quantitatively discharged from the tube by means of the gas overpressure.

Once a sample has been collected and measured as above and gas or air has started to be forced down through the tube 5, the device is in principle ready for a new sampling and measurement. One assumes in such case that the individual liquid samples are separated by the gas volume between them. At all events a new sampling and measurement can start as soon as a measured volume has left the device via the tube end 14.

The position of the liquid level 11 can be defined through the fact that liquid 3 is added via a tube 15 and the excess liquid 2 can run off through an overflow pipe 16. The detector device 7 can be moved along tube 4, whereby the measured volume can be varied.

In the embodiment in FIGS. 1 and 2 the measurement is made through the use of a flexible hose, by means of which the tube or hose orifice 10 can be rapidly caused to cut the water surface. The flexible portion can, of course, also consist, for example, of a helical tube, for example a thin-walled glass or metal tube. One may also, however, use entirely rigid tubes as in FIGS. 3, 4 and 5. The device in FIG. 3 requires in such case some form of seal, for example grinding of the contact surfaces, O-rings, cuffs, bellows, intermediate drainage etc. at the inlet through the wall of vessel 1, through which the tube is axially movable.

The device in FIG. 5 is characterized in that the rigid tubes are attached to a container with flexible wall material and of such form that, for example, a pressure in the direction of the arrows causes the point of attachment 21 to be lowered, whereby the tube orifice 10 is also lowered below the liquid level in the container given by the overflow pipe 16.

The liquid surface represented in the FIGURES may in principle have any form and size; it figures for example, be the surface of a lake or reservoir, the surface in a process flow or the like. The essential point is that the surface is so defined that the aforesaid function is achieved by the movements of the tube orifice 10 between its upper and lower limit positions defined by the device 13, 17, which, of course, can also be achieved by definition of the position of the tube orifice whereas the liquid surface is raised or lowered. The measuring device can in principle also be mounted in relation to a float or the like.

The measured volume can be varied within wide limits. The tube 4 can be made long and have the form, for example, of multiple coils or a helix, along which the detector 7 can be moved. If large volumes are desired, the tube 4 can be given one or more flares 8 as shown in FIG. 1 or be supplemented by a container 18 as shown in FIG. 6. The container 18 will then be filled to the level 19 of the tube 20, after which overflow takes place to the tube 4. The measurement can, as above, be made at a level 9, in which case, however, certain relations between the gas pressure above the liquid and the flow resistances in tubes 19 and 4 must be fulfilled. The most reliable method of level measurement in this case would be through detection of the passage of the meniscus at level 19. This arrangement allows collection of very large sample volumes and, in principle, there is no limit to the size of the container 18.

Often one is interested in very small liquid volumes. The smallest measurable liquid volume is defined by the shortest necessary length of tube between the tube orifice 10 and the detection level 9 and the smallest practicably acceptable internal tube diameter. The latter, in turn, is dependent, among other factors, on the permissible gas pressure above the liquid surface, namely for overcoming of capillary forces. With, for example, 0.5 mm internal tube diameter and tube length of 25 mm (cf.FIG. 3), the volume would be about $5\mu l$. If the measurement can be made with a margin of error of 0.5 mm liquid column, this would imply an error of 2 percent in measurement of the volume. For larger volumes, i.e. longer length of tube, the margin of error will be correspondingly less. The reproducibility could probably be improved beyond 0.5 mm, probably to 0.1–0.2 mm water column. By calibration of the liquid volume for every level 9 measured under defined experimental conditions, therefore, such as gas pressure, liquid viscosity, surface tension, temperature, tube material, time constants etc., it should be possible, if required, to keep the absolute measuring error to 1 per cent or below, even in the unfavourable case from the point of view of measuring technique of small sample volumes. e.g. 5–10 $\mu l$.

The detector device 7 can be formed according to known principles, e.g. pneumatic, capacitive, inductive, electric (conductivity) or optical. In the latter case light passes from a light source through a slit, the tube and an additional slit to the detector. The light from the source may pass via glass fibre, through the tube, continue through glass fibre or a slit, and thereafter reach the detector.

The raising and lowering mechanism, i.e. the actuation device 13, can likewise be formed according to various known principles and work electromagnetically, pneumatically, hydraulically or mechanically. The speed of the detector 7 and the actuator 13 must be great in relation to the speed of movement of the meniscus in tube 4. Furthermore the length of stroke of the device 13 should be so great that the tube orifice cuts through a liquid surface even with a great surface tension, and that this takes place relatively quickly. The actuation device should preferably be so arranged that, in idle condition, it keeps the tube orifice 10 above the water. The risk of leakage is then entirely eliminated.

Through the invention, accordingly, a device is suggested which is characterized particularly in that it contains no valve, or other means for shutting off the liquid, which may cause leakage. At the same time a high precision of measurement is attained; the error of measurement can be kept below 1 per cent. A high repetition frequency, i.e. rapid sampling and measurement, is attained. The device according to the invention covers in principle the entire volume range from a few $\mu l$ up to any desired volume, e.g. 1 l or more. The device can also be made entirely without moving parts in the liquid (see, in particular, the embodiments in FIGS. 2, 4, 7 and 8). In the variants with a moving part in the liquid the part may consist of a flexible hose or bellows with very small movements and therefore a long life. The moving parts outside the liquid system can be made on proven principles, using for example relay magnets, solenoid magnets or pneumatics with very high reliability, small lengths of stroke and small forces required for adjustment. They can be made easily replaceable, which simplifies and reduces the cost of maintenance. Within certain limits the measurement device according to the invention can be placed at a distance from the vessel in which the sample is to be delivered. The outlet end 14 of the tube may be fixed or movable. Finally the device according to the invention should be usable for several different types of sampling, e.g. sampling or reagent pipettes on a semimicro and macro scale for sampling in process flows within the chemical industry, in watercourses, purification plants, sewage water and so on.

What is claimed is:

1. A device for automatic sampling and measurement of liquid volumes, comprising a tube-like member having an orifice at one end submersible in the liquid from which a volume is to be sampled and measured, the orientation of the tube and the relative pressures at said orifice end and the other end of the tube-like member being such that liquid will flow through the tube-like member when its orifice end is submerged in the liquid, means located along the tube-like member for detecting the arrival at a predetermined point of a liquid gas interface moving therethrough, and a means responsive to said detection for effecting relative movement between said orifice end and the liquid surface to relatively move said orifice end out of the liquid, whereupon the volume of liquid in the tube-like member is forced out through the other end as a measured sample corresponding to the volume of the tube-like member between said orifice end and said predetermined point.

2. A device as claimed in claim 1 wherein said detector is movable along the tube-like member for setting of the desired liquid volume to be measured.

3. A device as claimed in claim 1 wherein said tube-like member comprises a capillary tube.

4. A device as claimed in claim 1 further comprising means defining an enlarged volume connected in said tube-like member between said orifice end and said other end.

5. A device as claimed in claim 1 wherein there is a gas above the liquid surface at an elevated pressure relative to the pressure at said other end of said tube-like member.

6. A device as claimed in claim 1 wherein said orifice end is vertically movable, and wherein said tube-like member includes a flexible section to permit said vertical movement.

7. A device as claimed in claim 1 wherein said liquid is contained in a flexible-walled container, and said tube-like member passes through said wall and is mounted such that the movement of said orifice end into and out of said liquid is accommodated by flexure of said flexible wall.

8. A device as claimed in claim 1 wherein said liquid is contained in a container having an opening through a surface thereof, and said tube-like member is slidably and sealably disposed in said opening for vertical movement of said orifice end above and below the liquid surface.

9. A device as claimed in claim 1 wherein said liquid is contained within a container, and further comprising means for maintaining the liquid level therein at a predetermined level.

10. A device as claimed in claim 1 wherein said other end of said tube-like member is disposed below said orifice end.

* * * * *